UNITED STATES PATENT OFFICE.

GEORGE VINING, OF STOCKBRIDGE, ASSIGNOR OF ONE-FOURTH OF HIS RIGHT TO E. F. PECK, OF GREAT BARRINGTON, MASSACHUSETTS.

SIZING FOR PAPER, &c.

SPECIFICATION forming part of Letters Patent No. 223,459, dated January 13, 1880.

Application filed June 24, 1879.

*To all whom it may concern:*

Be it known that I, GEORGE VINING, of Stockbridge, Berkshire county, Massachusetts, have invented a Sizing for Paper, &c., of which the following is a specification.

A sizing that will preserve the color of the water-leaf and that can be used at the proper time in the beating-engines, saving thereby the lofting labor, time in drying, the room, and heat necessary when what is termed a "tub-size" is used, has long been desired.

My sizing can be used in the beating-engines, or, as what paper-makers call, "engine-size," and set in the usual way, or as a tub-size; and it consists in the use of caseine, either animal or vegetable, brought to the proper or required consistency by triturating with or heating a proper time in a saline solution of soda or potassa, as preferred. I use borax in any proportion required, extracting the caseine from skimmed or skim milk by the use of acetic or other acids, or by the use of rennet. I then wash, press, or drain all I desire, (not very material,) and gradually add the saturated solution, or dilute, as desired, with trituration or heat, as aforesaid.

What I claim as my invention is—

1. The use of caseine in sizing for paper and other substances.

2. The use of caseine, in combination with borax, (*sodæ biboras,*) substantially as described and set forth in the foregoing specification, or its equivalent.

GEO. VINING, M. D.

Witnesses:
H. J. DUNHAM,
F. J. PRATT.